US012711131B2

(12) United States Patent
Ng et al.

(10) Patent No.: US 12,711,131 B2
(45) Date of Patent: Aug. 18, 2026

(54) METHODS, SYSTEMS, AND DEVICES FOR ADJUSTING A USER QUERY IN REQUESTING INFORMATION FROM A KNOWLEDGE GRAPH DATABASE

(71) Applicant: JPMorgan Chase Bank, N.A., New York, NY (US)

(72) Inventors: Brenda Ng, Danville, CA (US); Apoorva Jaiswal, San Jose, CA (US); Jane Hu, Louisville, KY (US); Juan Yu, San Carlos, CA (US); Apoorv Chaudhary, Hayward, CA (US); Thanigaimani Keeran, Danville, CA (US)

(73) Assignee: JPMorgan Chase Bank, N.A., New York, NY (US)

( * ) Notice: Subject to any disclaimer, the term of this patent is extended or adjusted under 35 U.S.C. 154(b) by 178 days.

(21) Appl. No.: 18/432,884

(22) Filed: Feb. 5, 2024

(65) Prior Publication Data

US 2025/0252097 A1 Aug. 7, 2025

(51) Int. Cl.
*G06F 17/27* (2006.01)
*G06F 16/2452* (2019.01)

(52) U.S. Cl.
CPC .............................. *G06F 16/24522* (2019.01)

(58) Field of Classification Search
CPC ........ G06N 20/00; G06N 5/022; G06N 3/042; G06N 3/08; G06N 3/02; G06N 5/02; G06N 5/04; G06F 16/00; G06F 16/10; G06F 16/20; G06F 16/242; G06F 16/24522; G06F 16/243; G06F 16/3329; G06F 16/367; G06F 16/9024; G06F 40/279; G06F 16/334; G06F 16/2455; G06F 16/248; G06F 16/3331; G06F 16/90335; G06F 16/9538;
(Continued)

(56) References Cited

U.S. PATENT DOCUMENTS

2023/0031591 A1* 2/2023 Remis .................. G06F 16/9038
2024/0104139 A1* 3/2024 Li ........................ G06F 16/2423
(Continued)

FOREIGN PATENT DOCUMENTS

EP 4614396 A1 * 9/2025 ............... G06N 7/06

*Primary Examiner* — Michael Ortiz-Sanchez
(74) *Attorney, Agent, or Firm* — GUNTIN & GUST, PLC; Atanu Das

(57) ABSTRACT

Aspects of the subject disclosure may include, for example, obtaining a user query to access information from a group of knowledge graph databases, the user query corresponding to user-generated input, and identifying a group of terms within the user query that reduces a likelihood of identifying a match within the group of knowledge graph databases. Further embodiments can include adjusting the user query resulting in a first adjusted user query that enables identifying a knowledge graph database from the group of knowledge graph databases, identifying the knowledge graph database from the group of knowledge graph databases based on the first adjusted user query, and generating a first database query based on the first adjusted user query and the knowledge graph database, in which the first database query would have a computer-readable syntax compatible with the identified knowledge graph database. Other embodiments are disclosed.

20 Claims, 20 Drawing Sheets

(58) Field of Classification Search
CPC ............. G06F 16/24534; G06F 16/245; G06F 16/24528; G06F 16/3332; G06F 16/903; G06F 16/9032; G06F 16/432; G06F 16/9532; G06F 40/30; G06F 40/35; G06F 16/953; G06F 40/10; G06F 40/205
See application file for complete search history.

(56) References Cited

U.S. PATENT DOCUMENTS

2024/0330278 A1* 10/2024 Farré Guiu ........... G06F 16/248
2024/0362208 A1* 10/2024 Naufel .................. G06F 16/243
2025/0139151 A1* 5/2025 Bianchini ........... G06F 16/3329
2025/0200044 A1* 6/2025 Xu ...................... G06F 16/9024

* cited by examiner

100

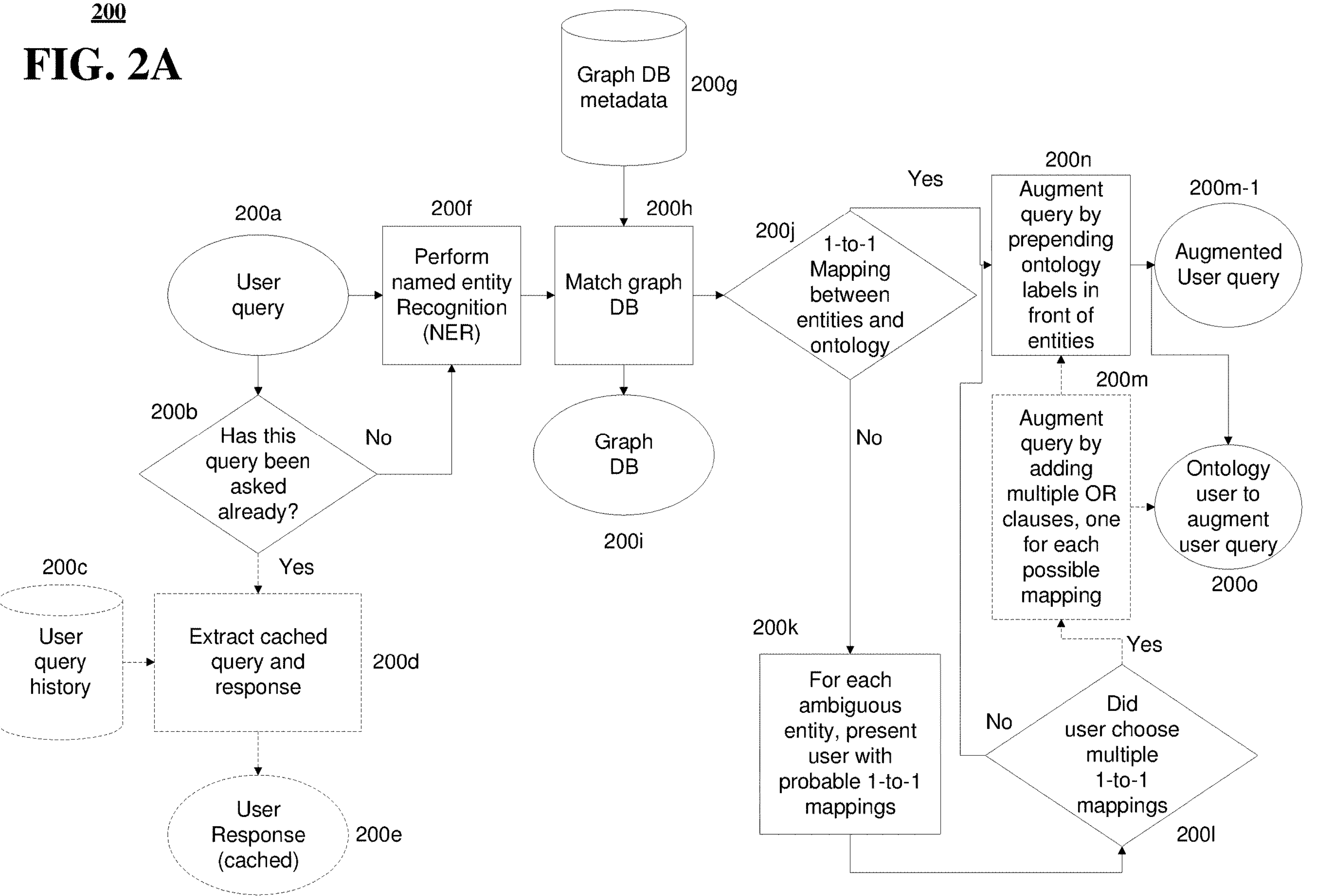
200
FIG. 2A
User query
200a
Has this query been asked already?
200b
No
Yes
User query history
200c
Extract cached query and response
200d
User Response (cached)
200e
Perform named entity Recognition (NER)
200f
Graph DB metadata
200g
Match graph DB
200h
Graph DB
200i
1-to-1 Mapping between entities and ontology
200j
Yes
No
For each ambiguous entity, present user with probable 1-to-1 mappings
200k
Did user choose multiple 1-to-1 mappings
200l
Yes
No
Augment query by adding multiple OR clauses, one for each possible mapping
200m
Augment query by prepending ontology labels in front of entities
200n
Augmented User query
200m-1
Ontology user to augment user query
200o

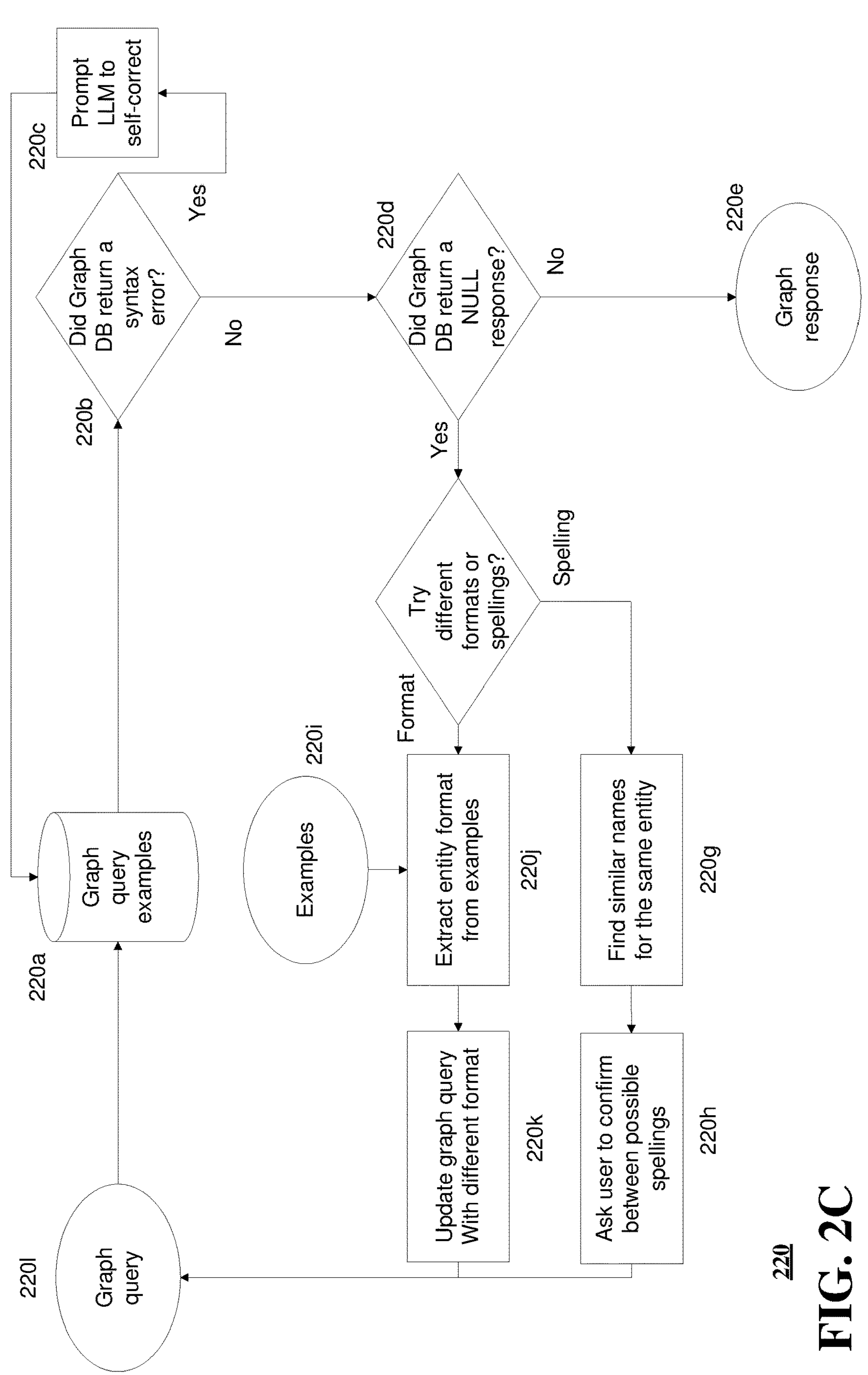
Prompt LLM to self-correct
220c
Did Graph DB return a syntax error?
Yes
No
220b
220d
Did Graph DB return a NULL response?
No
Yes
220e
Graph response
Try different formats or spellings?
Spelling
Format
220i
Examples
Extract entity format from examples
220j
Find similar names for the same entity
220g
Graph query examples
220a
Update graph query With different format
220k
Ask user to confirm between possible spellings
220h
Graph query
220l
220
FIG. 2C

Figure 3E:
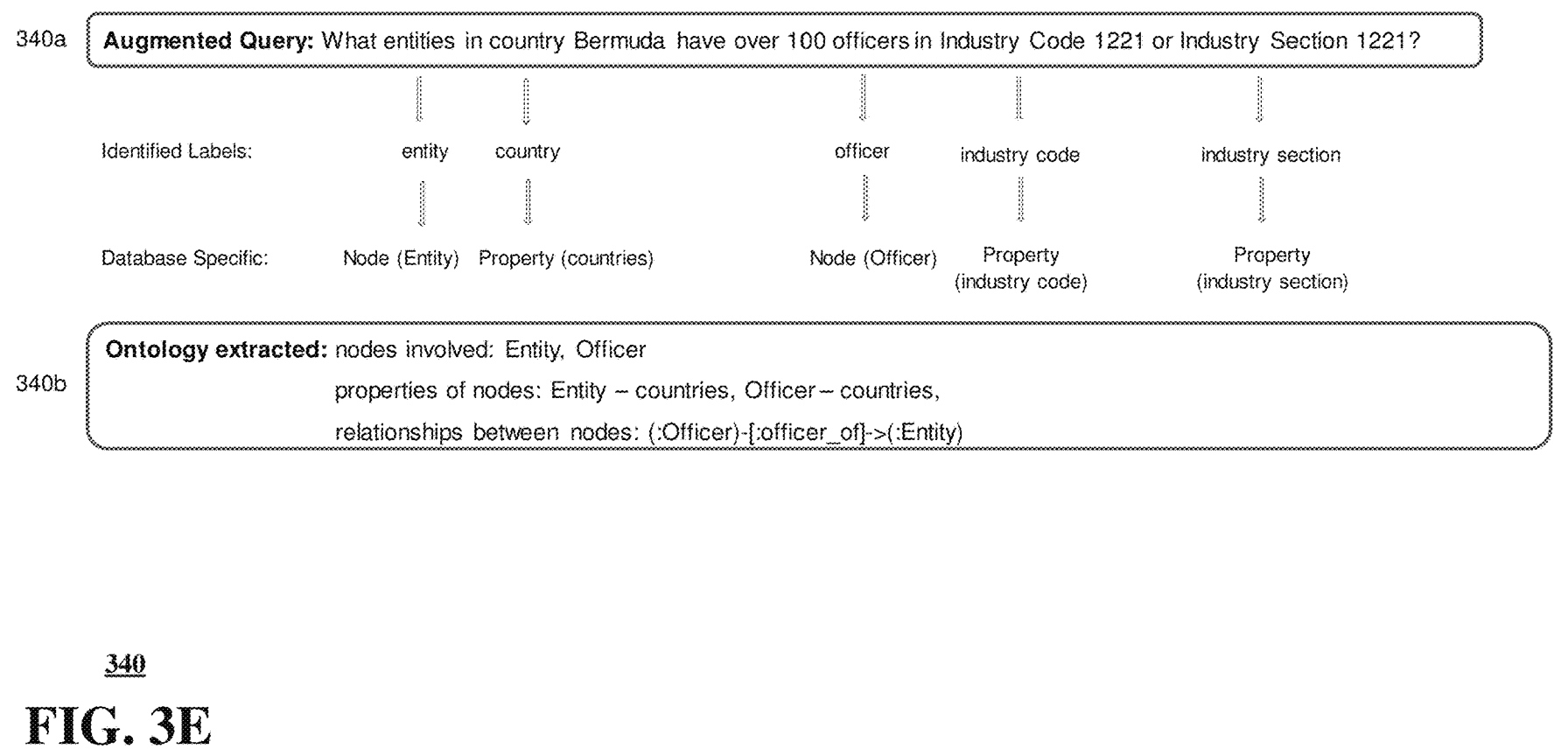

340a
Augmented Query: What entities in country Bermuda have over 100 officers in Industry Code 1221 or Industry Section 1221?

Identified Labels: entity country officer industry code industry section

Database Specific: Node (Entity) Property (countries) Node (Officer) Property (industry code) Property (industry section)

340b
Ontology extracted: nodes involved: Entity, Officer
properties of nodes: Entity – countries, Officer – countries,
relationships between nodes: (:Officer)-[:officer_of]->(:Entity)

Figure 3F:
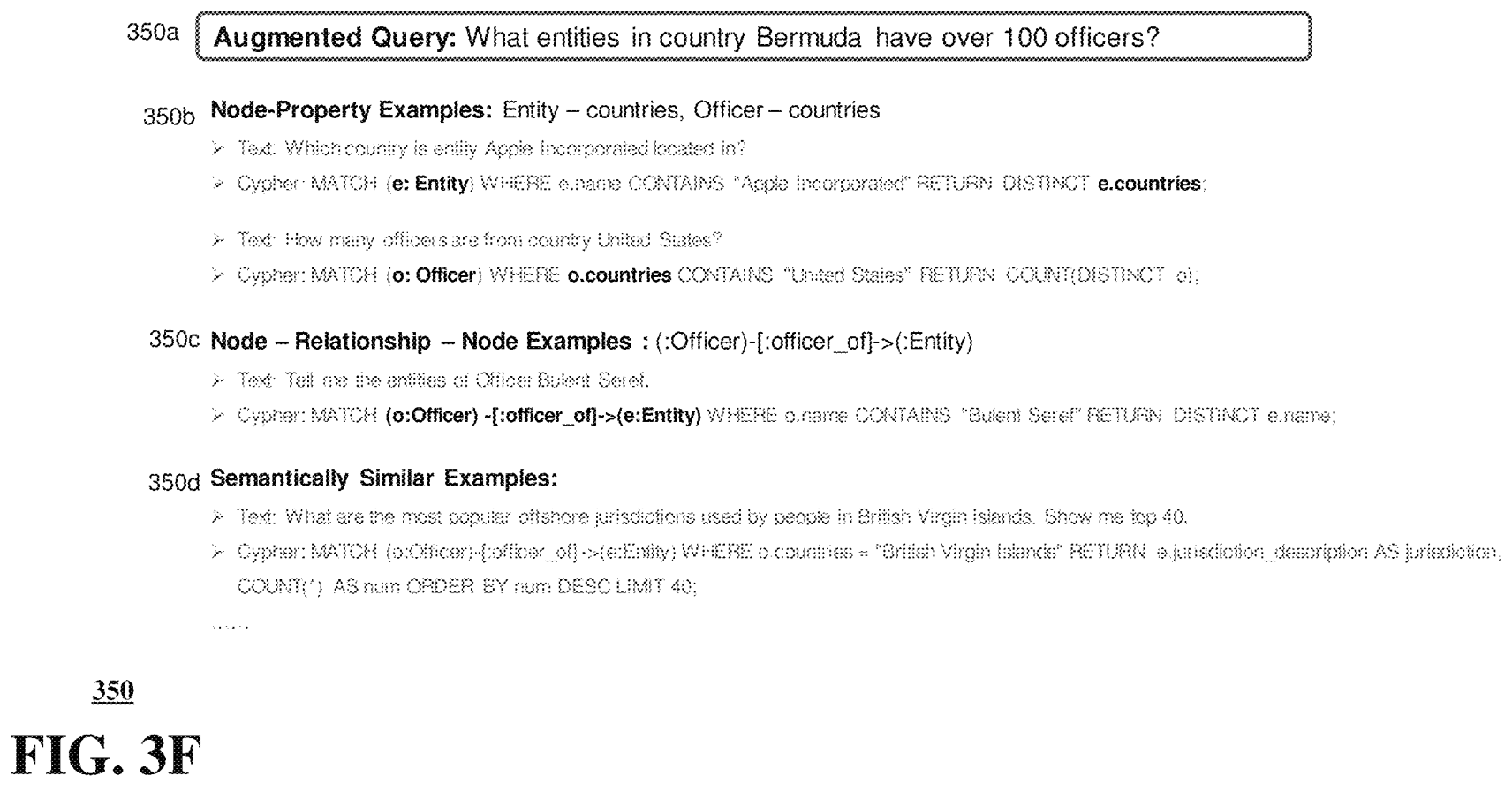

350a Augmented Query: What entities in country Bermuda have over 100 officers?

350b Node-Property Examples: Entity – countries, Officer – countries

- Text: Which country is entity Apple Incorporated located in?
- Cypher: MATCH (e: Entity) WHERE e.name CONTAINS "Apple Incorporated" RETURN DISTINCT e.countries;

- Text: How many officers are from country United States?
- Cypher: MATCH (o: Officer) WHERE o.countries CONTAINS "United States" RETURN COUNT(DISTINCT o);

350c Node – Relationship – Node Examples : (:Officer)-[:officer_of]->(:Entity)

- Text: Tell me the entities of Officer Bulent Seref.
- Cypher: MATCH (o:Officer) -[:officer_of]->(e:Entity) WHERE o.name CONTAINS "Bulent Seref" RETURN DISTINCT e.name;

350d Semantically Similar Examples:

- Text: What are the most popular offshore jurisdictions used by people in British Virgin Islands. Show me top 40.
- Cypher: MATCH (o:Officer)-[:officer_of]->(e:Entity) WHERE o.countries = "British Virgin Islands" RETURN e.jurisdiction_description AS jurisdiction, COUNT(*) AS num ORDER BY num DESC LIMIT 40;

METHODS, SYSTEMS, AND DEVICES FOR ADJUSTING A USER QUERY IN REQUESTING INFORMATION FROM A KNOWLEDGE GRAPH DATABASE

FIELD OF THE DISCLOSURE

The subject disclosure relates to methods, systems, and devices for adjusting a user query in requesting information from a knowledge graph database.

BACKGROUND

A corporation or different businesses within the corporation can utilize knowledge graph (KG) databases to store connected datasets. However, querying a knowledge graph database can be cumbersome for a user as they must learn the database query language associated with the knowledge graph database to formulate the query. Further, different types of knowledge graph databases can be associated with different database query languages, which adds to the cumbersome nature in formulating a query.

BRIEF DESCRIPTION OF THE DRAWINGS

Reference will now be made to the accompanying drawings, which are not necessarily drawn to scale, and wherein:

FIGS. 2A, 2B, 2C, 2D, and 2E depict illustrative embodiments of methods in accordance with various aspects described herein.

FIGS. 3A, 3B, 3C, 3D, 3E, 3F, 3G, 3H, 3I, 3J, 3K, and 3L describe various exemplary aspects of the systems that implement methods depicted in FIGS. 2A, 2B, 2C, 2D, and 2E.

DETAILED DESCRIPTION

Figure 1:
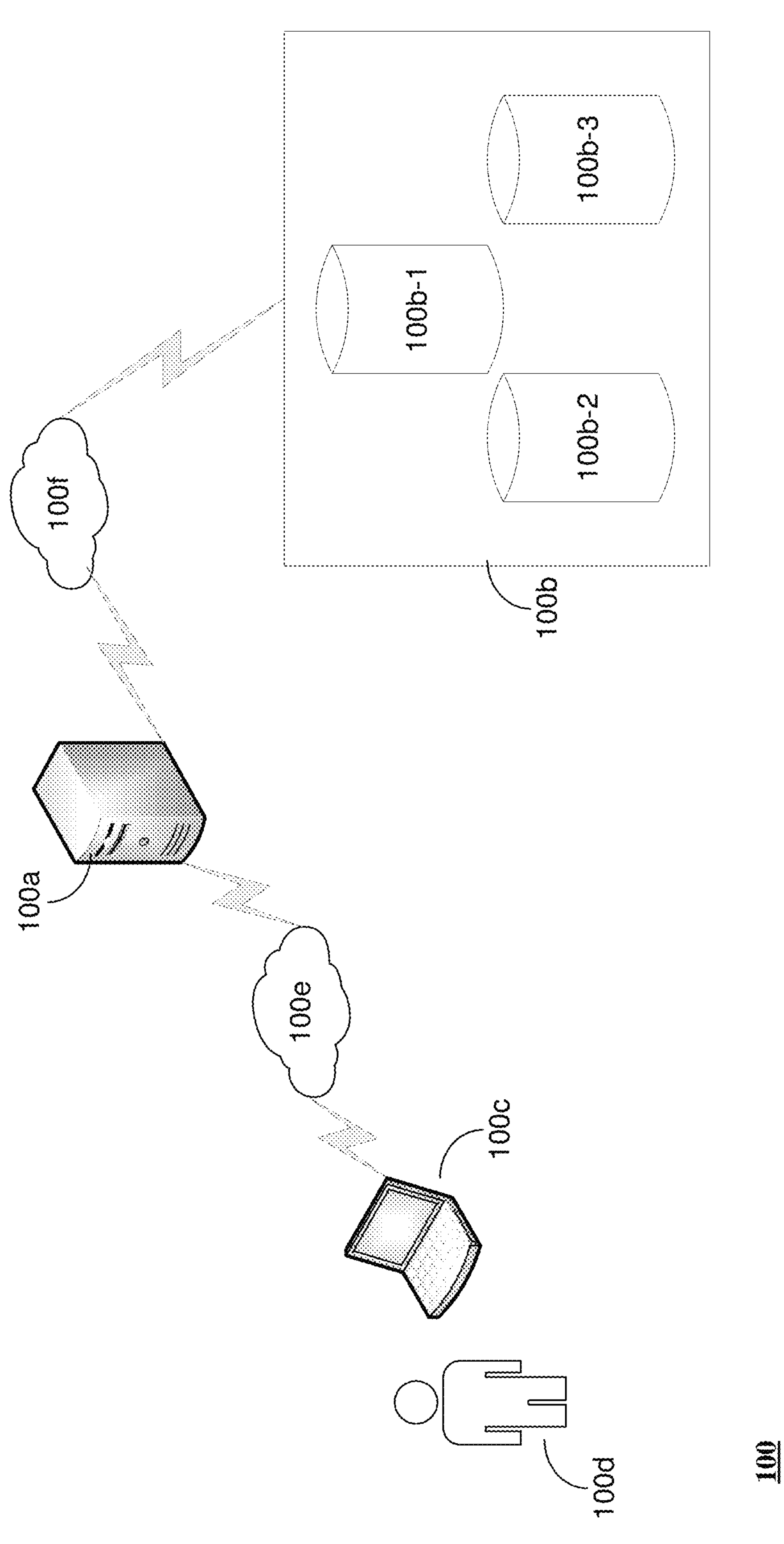
FIG. 1 depicts an illustrative embodiment of a block diagram of a system in accordance with various aspects described herein.

The subject disclosure describes, among other things, illustrative embodiments for obtaining a user query to access information from a group of knowledge graph databases, the user query corresponding to user-generated input, and identifying a group of terms within the user query that reduces a likelihood of identifying a match within the group of knowledge graph databases. Further embodiments can include adjusting the user query resulting in a first adjusted user query that enables identifying a knowledge graph database from the group of knowledge graph databases, identifying the knowledge graph database from the group of knowledge graph databases based on the first adjusted user query resulting in an identified knowledge graph database, and generating a first database query utilizing a large language model based on the first adjusted user query and the knowledge graph database, the first database query having a computer-readable syntax compatible with the identified knowledge graph database. Other embodiments are described in the subject disclosure.

One or more aspects of the subject disclosure include a device, comprising a processing system including a processor, and a memory that stores executable instructions that, when executed by the processing system, facilitate performance of operations. The operations can comprise obtaining a user query to access information from a group of knowledge graph databases, the user query corresponding to user-generated input, and identifying a group of terms within the user query that reduces a likelihood of identifying a match within the group of knowledge graph databases. Further operations can comprise adjusting the user query resulting in a first adjusted user query that enables identifying a knowledge graph database from the group of knowledge graph databases, identifying the knowledge graph database from the group of knowledge graph databases based on the first adjusted user query resulting in an identified knowledge graph database, and generating a first database query utilizing a large language model based on the first adjusted user query and the knowledge graph database, the first database query having a computer-readable syntax compatible with the identified knowledge graph database.

One or more aspects of the subject disclosure include a non-transitory machine-readable medium, comprising executable instructions that, when executed by a processing system including a processor, facilitate performance of operations. The operations can comprise obtaining a user query to access information from a group of knowledge graph databases, and identifying a group of terms within the user query that reduces a likelihood of identifying a match within the group of knowledge graph databases. Further operations can comprise adjusting the user query resulting in an adjusted user query that enables identifying a knowledge graph database from the group of knowledge graph databases, identifying a knowledge graph database from the group of knowledge databases based on the adjusted user query resulting in an identified knowledge graph, and converting the adjusted user query to a database query utilizing a large language model based on the knowledge graph database.

One or more aspects of the subject disclosure include a method. The method can comprise obtaining, by a processing system including a process, a user query to access information from a group of knowledge graph databases, and identifying, by the processing system, a group of terms within the user query that reduces a likelihood of identifying a match with the group of knowledge graph databases. Further, the method can comprise adjusting, by the processing system, the user query resulting in an adjusted user query that enables identifying a knowledge graph database from the group of knowledge graph databases, identifying, by the processing system, the knowledge graph database from the group of knowledge databases based on the adjusted user query resulting in an identified knowledge graph database, and generating, by the processing system, a database query utilizing a large language model based on the adjusted user query and the knowledge graph database.

FIG. 1 depicts an illustrative embodiment of a block diagram of a system in accordance with various aspects described herein.

One or more embodiments include leveraging large language models (LLMs), to build a software application that enables users, without coding skills, to query a knowledge graph (KG) database using natural language. Traditionally, a user would utilize, for example, LangChain, a framework for chaining up different software agents from assignment to execution. However, this prevents intervention in situations when the software agents fail because the LangChain framework generally operates as a blackbox. Further embodiments include: a system that (1) clarifies ambiguities of terms in a user query to a KG database (e.g., corrects spelling errors, reconciles vague entities, etc.) and generate robust prompts; (2) feeds the prompts into the LLM to generate database queries in a database query language (e.g., in Cypher, etc.); (3) retrieves the response from the KG database; (4) performs error handling and self-correction if initial response is unsatisfactory based on response criteria; and (5) once a satisfactory response is achieved, converts the response back to a user-friendly format (e.g., natural language) query response and present/displays the user query response to the user. The architecture of the embodiments described herein can be generalized to any LLM capable of code generation and any database.

One or more embodiments perform sophisticated handling of all the above complexities under-the-hood, providing for a seamless experience to the user. Conventional approaches include: (1) mapping the KG into separate documents then applying LLM to query these documents; and/or (2) querying the KG directly without guardrails for ensuring robustness (e.g., resolution of query ambiguity) and preventing hallucinations. The first approach may result in suboptimal queries as the knowledge graph structure is now eliminated and could also incur processor and storage costs of intermediary results (e.g., embedding vectors of these graph-induced documents). The second approach is generally applied to small or extremely well-defined (i.e., static) KGs, and lacks the rigor required for deployment of enterprise-level, dynamic KGs. In general, these approaches are not robust against the scale and response quality demanded by real-world applications.

Referring to FIG. 1, in one or more embodiments, system 100 comprises a server 100*a* that can be communicatively coupled to a communication device 100*c* associated with a user 100*d* over a communication network 100*e*. Further, the server 100*a* can be communicatively coupled to a group of knowledge graph databases 100*b* over a communication network 100*f*. The group of knowledge graph databases 100*b* can comprise knowledge graph database 100*b*-1, knowledge graph database 100*b*-2, and knowledge graph database 100*b*-3.

In one or more embodiments, a knowledge graph database is a way of organizing data that highlights relationships between data points. The knowledge graph representation comprises a network of interconnected data points reflecting their relationship to one another. Each of communication network 100*e* and 100*f* can comprise a wireless communication network, a wired communication network, or a combination thereof. In some embodiments, communication network 100*e* and communication network 100*f* can be portions of the same communication network. Communication device 100*c* can comprise a laptop computer, desktop computer, smartphone, mobile phone, smartwatch, wearable device or any other communication device. Server 100*a* can comprise one or more servers in one location, one or more servers spanning multiple locations, one or more cloud servers, one or more virtual servers in one location, and/or one or more virtual servers spanning multiple locations.

In one or more embodiments, the server 100*a* can obtain a user query from communication device 100*c* over communication network 100*e* to access information from the group of knowledge graph databases 100*b*. The user query corresponds to user-generated input provided by the user 100*d* into communication device 100*c*. Further, the server 100*a* can identify a group of terms within the user query that reduces a likelihood of identifying a match within the group of knowledge graph databases. That is, the user query comprises ambiguities in one or more terms such that the server cannot identify a knowledge graph database of the group of knowledge graph databases 100*b* to query. In addition, the server 100*a* can adjust the user query resulting in an adjusted user query that enables identifying a knowledge graph database from the group of knowledge graph databases. Also, the server 100*a* can identify the knowledge graph database 100*b*-1, for example, from the group of knowledge graph databases 100*b* based on the adjusted user query resulting in an identified knowledge graph database. The server 100*a* can generate a database query utilizing a large language model (LLM) based on the adjusted user query and the knowledge graph database 100*b*-1. The database query can have a computer-readable syntax compatible with in a database query language (e.g., Cypher) associated with the identified knowledge graph database 100*b*-1.

In one or more embodiments, the server 100*a* can request a database query response (e.g., send a request over communication network 100*f*) from the identified knowledge graph database 100*b*-1 according to the database query. Further, the server 100*a* can obtain the database query response from the identified knowledge graph database 100*b*-1 based on the database query. In addition, the server 100*a* can determine that the database query response satisfies a response criteria resulting in a determination. Also, the server 100*a* can generate a user query response in a natural language based on the database query response and the determination. The server 100*a* can present the user query response to user 100*d* by sending the user query response to the communication device 100*c* over communication network 100*e* in which the communication device 100*c* presents the user query response to the user 100*d*.

FIGS. 2A, 2B, 2C, 2D, and 2E depict illustrative embodiments of methods in accordance with various aspects described herein. In one or more embodiments, a user poses a query in natural language to a KG database and obtains a response satisfying that query. In traditional practice, interactions with a KG database require the user to encode the query in a graph/database query language (e.g., Cypher). In general, query languages, such as Cypher, are extremely sensitive to exact semantics/syntax (i.e., reference to specific nodes/relationships/properties within a graph's ontology). This poses a real challenge for users because a general user would not know how data is stored in the graph (ontology) nor the graph query language (grammar/syntax) to encode their query. This challenge is exacerbated when the KG database is large (i.e., large ontology) resulting in more potential points-of-failures (e.g., misunderstanding the ontology in crafting the query in the database query language resulting in a null response). Leveraging large language models (LLMs) for semi-automated graph/database query generation may help but LLMs need to be augmented to ensure robustness.

In one or more embodiments, users pose queries in natural language to query any KG database. Some embodiments alleviate the user's burden in having to know the knowledge graph database query language and exact semantics/syntax associated with the KG database. Further embodiments are designed to be highly fault-tolerant and may be used as a knowledge graph query co-pilot. Some embodiments can be generalizable to multiple knowledge graph databases and improve robustness of knowledge graph database queries with multiple points of validations to mitigate null or invalid responses. Further embodiments resolve various ambiguities within the user query with human-in-the-loop and store them for future reference. Additional embodiments generate a personal graph for each user to enhance the user experience. Other embodiments provide a feedback mechanism to improve/update the KG database.

Referring to FIG. 2A, in one or more embodiments, the method 200 can be implemented by a server to augment (adjust) a user query to remove ambiguities in natural language. At 200*a*, the server can obtain a user query from a user's communication device. At 200*b*, the server determines whether the user query has been asked previously. If so, at 200*d*, the server extracts the cached user query and cached user query response from a user query history database 200*c*. At 200*e*, the server provides the cached user query response to the user's communication device to be presented to the user. Caching previous user queries and user query responses improves the utilization of the server by accessing one or more knowledge graph databases repetitively for previously posed user queries.

In one or more embodiments, at 200*b*, if the server determines that the user query has not been asked previously, then the server, at 200*f*, can perform named entity reconciliation to identify the entities being referenced in the user's query. At 200*h*, the server matches the KG database, at 200*g*, extracts KG database metadata, and at 200*i*, identifies a KG database 200*i*.

In one or more embodiments, at 200*j*, the server takes the extracted entity from the user query and performs matching against all possible entities in the ontology of the KG database. An ontology is a description of a data structure (classes, properties, relationships, etc.) in a domain of knowledge. It can be the foundation of a knowledge graph database that ensures data consistency and understanding of the data model associated with the knowledge graph database. If there is a one-to-one mapping (i.e., match) between entities and the ontology of the KG database, then the server, at 200*n*, can augment (adjust) the user query by prepending ontology labels in front of the entities. If there is not a one-to-one mapping, the server, at 200*k*, can present user with probable one-to-one mappings (i.e., probably entities that can be matched against the ontology) for the user to select. Further, the server can determine whether the user selected multiple one-to-one mappings for each (ambiguous) entity that was not successfully matched. If the user selected a single on-to-one mapping for each ambiguous entity, it would be adequate in resolving the ambiguity. Then the server, at 200*n*, can augment (adjust) the user query by prepending ontology labels in front of the entities. Otherwise, if the user selected multiple one-to-one mappings, the server, at 200*m* can augment (adjust) the user query by adding multiple OR clauses, one for each user selected mapping. At 200*m*-1, the server generates the augmented (adjusted) user query and at 2000, generates the ontology used to augment (adjust) the user query.

Figure 2B:
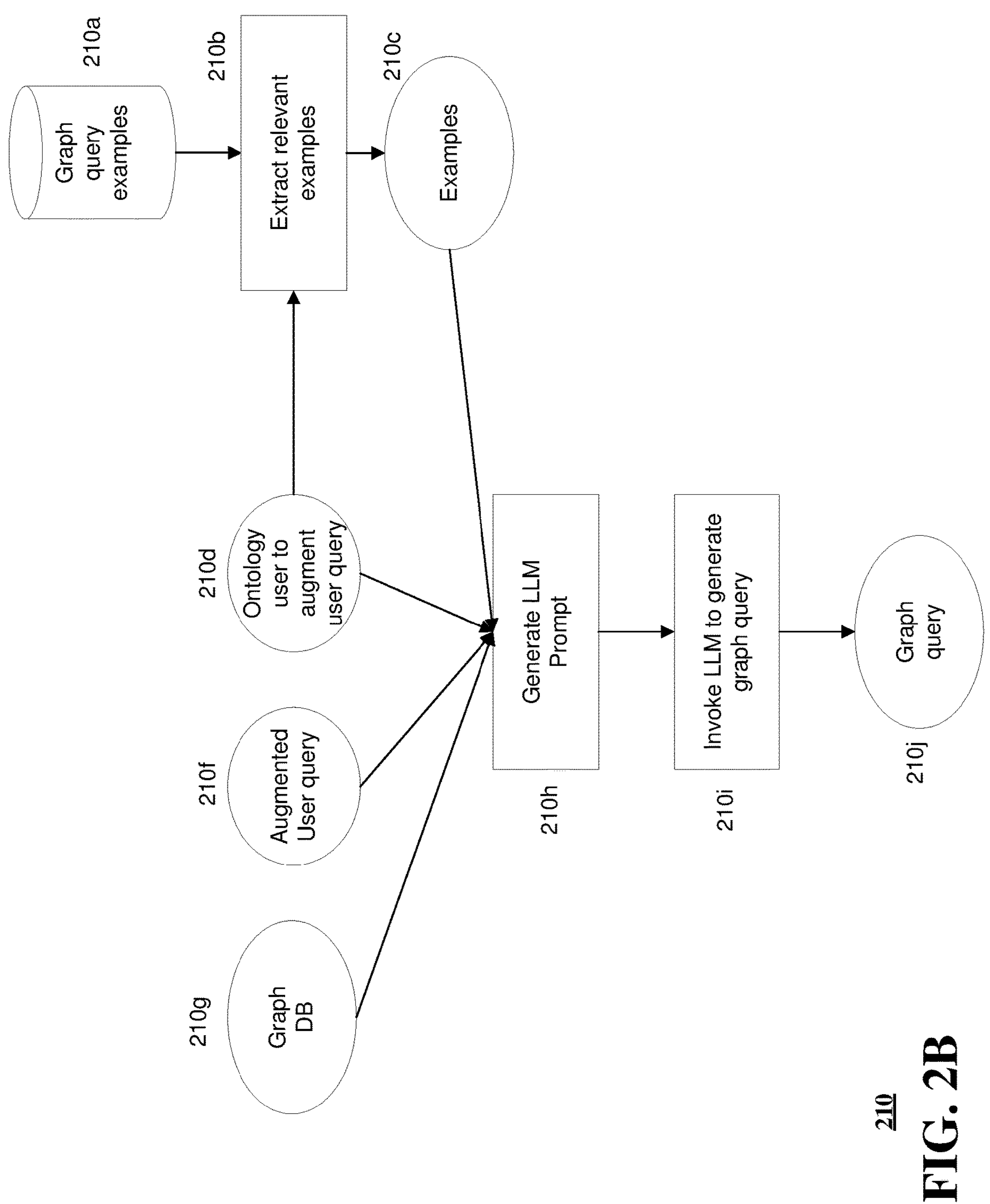

Referring to FIG. 2B, in one or more embodiments, method 210 can be implemented by a server to translate the augmented (adjusted) user query into a graph (database) query in a database query language (e.g., Cypher). The server, at 210*b* can extract relevant example graph (database) queries from a database 210*a* of graph (database) query examples resulting in a group of examples 210*c*. Further, the server at 210*h*, can generate a LLM prompt to be fed into the LLM based on the identified KG database 210*g*, the augmented (adjusted) user query 210*f*, and the ontology used to augment (adjust) user query 210*d*. The ontology of the augmented (adjusted) user query 210*d* can be used in extracting of the relevant example graph (database) queries. In addition, the server, at 210*i*, can invoke the LLM to generate a graph (database) query resulting in the server generating, at 210*j*, a graph (database) query in the database query language (e.g., Cypher).

Referring to FIG. 2C, in one or more embodiments, method 220 can be implemented by a server to correct semantic/syntax errors in graph (database) query to obtain a valid graph (database) query response. The server can access KG database 220*a* based on the graph (database) query. Upon receiving a graph (database) query response, the server, at 220*b*, can determine whether the graph (database) query response includes a syntax error. If so, the server, at 220*c*, can prompt the LLM to self-correct to generate a corrected graph (database) query and access KG database 220*a* based on this corrected graph (database) query. If not, the server, at 220*d*, can determine whether the graph (database) query response is a NULL response. If it is determined there is no NULL response, then the server, at 220*e*, can store the graph (database) query response. If it is determined that there is a NULL response, the server, at 220*f*, can adjust the graph (database) query with different formats or spellings.

In one or more embodiments, if the server adjusts for different spellings, the server, at 220*g*, can find similar names for the same entity within the graph (database) query. Further, the server, at 220*h*, can ask the user to confirm between possible spellings to determine an updated graph (database) query. If the server adjusts for different formats, the server, at 220*j*, can extract entity format from examples 220*i* (stored in a database). Further, the server, at 220*k*, can update the graph (database) query with different formats.

Figure 2D:
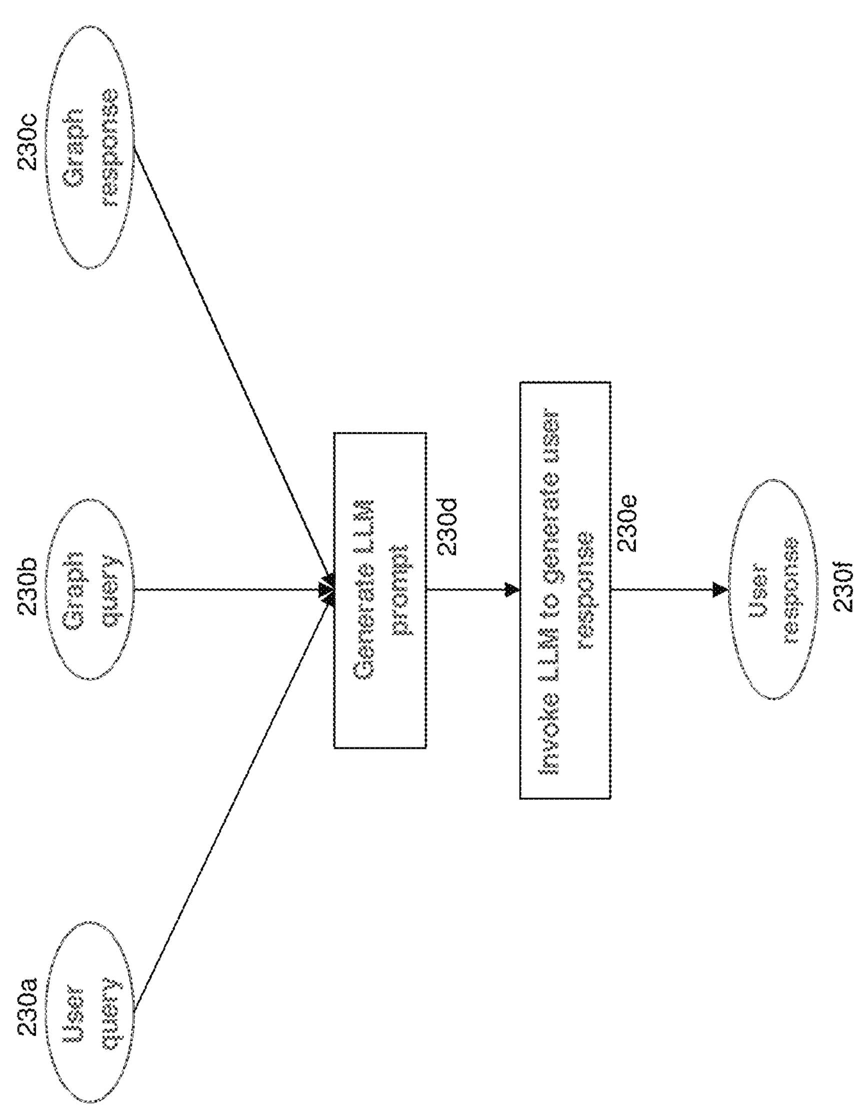

Refer to FIG. 2D, in one or more embodiments, method 230 can be implemented by a server to convert a graph (database) response to a natural language user query response and present it to a user. The server, at 230*d*, can generate LLM prompt based on a user query 230*a*, a graph (database) query 230*b*, and a graph (database) query response 230*c*. Further, the server, at 230*e*, can invoke the LLM to generate a user query response 230*f* in natural language.

Figure 2E:
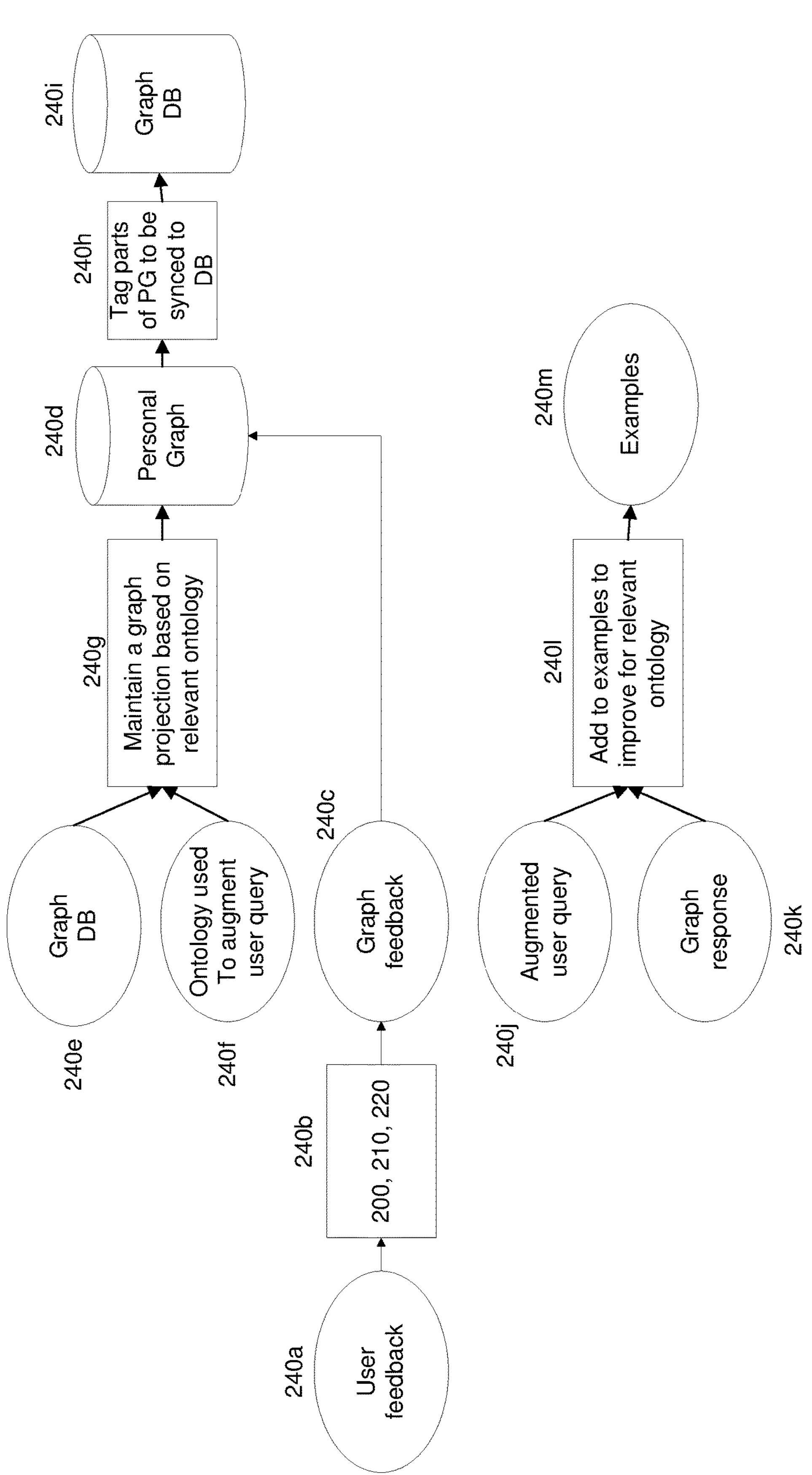

Referring to FIG. 2E, in one or more embodiments, method 240 can be implemented by a server to store intermediate artifacts into a personal knowledge graph database and apply feedback to update the personal knowledge graph database. The server, at 240*b*, obtains user feedback 240*a* on the results of methods 200, 210, and 220 resulting in graph feedback 240*c* to store in a personal knowledge graph database 240*d*. Further, the server, at 240*g*, can maintain a graph projection based on relevant ontology based on the identified knowledge graph database and the ontology used to augment (adjust) the user query. In addition, the server, at 240*h*, can tag parts of the personal knowledge graph database to be synchronized to the identified knowledge graph database 240*i*. In addition, the server, at 240*l*, can add examples to improve coverage for relevant ontology based on the augmented (adjusted) user query 240*j* and the graph (database) query response to an examples database 240*m*.

Figure 3A:
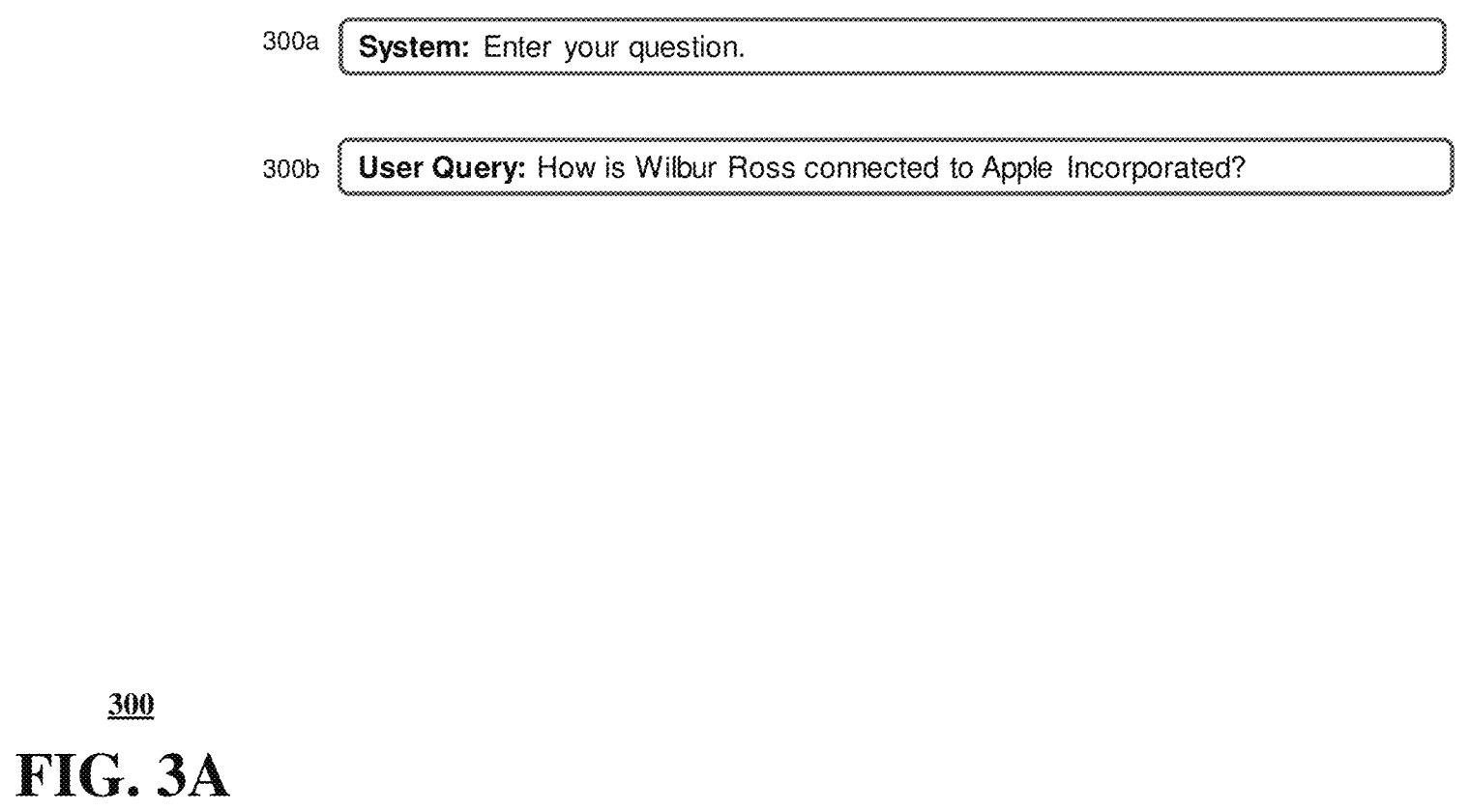
Figure 3B:
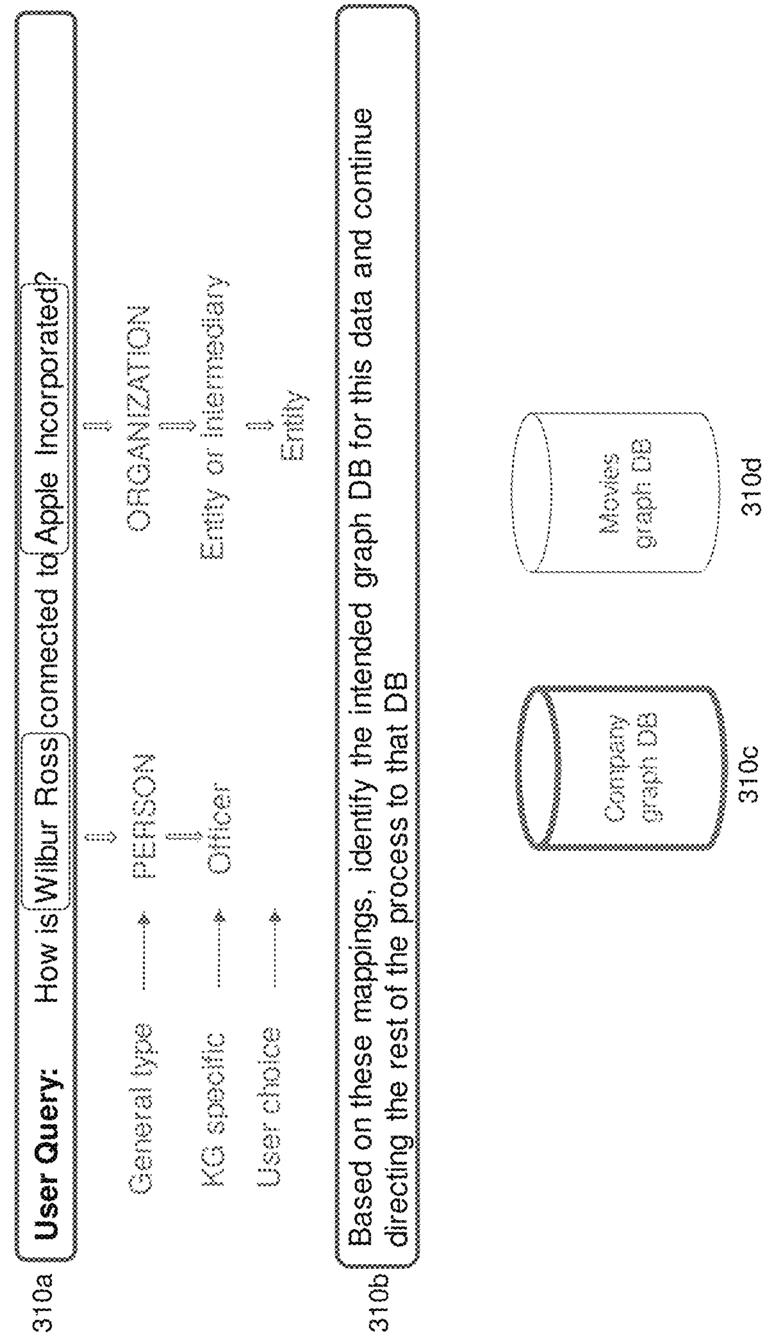

FIGS. 3A, 3B, 3C, 3D, 3E, 3F, 3G, 3H, 3I, 3J, 3K, and 3L describe various exemplary aspects of systems that implement aspects of the methods depicted in FIGS. 2A, 2B, 2C, 2D, and 2E. Referring to FIG. 3A, in one or more embodiments, a system 300 can prompt 300*a* a user to input a user query. Further, the user can input a user query 300*b*. Referring to FIG. 3B, in one or more embodiments, system 310 can identify a knowledge graph database from a group of knowledge graph databases based on named entity recognition. After obtaining a user query 310*a* from a user, the system 310 implements named entity reconciliation on the user query 310*a* to identify names in the user query 310*a*, and map general types of names to specific labels from the different knowledge graph databases. Further, based on these mappings 310*b*, identify a knowledge graph database 310*c* for the user query 310*a* from another knowledge graph database 310*d*.

Figure 3C:
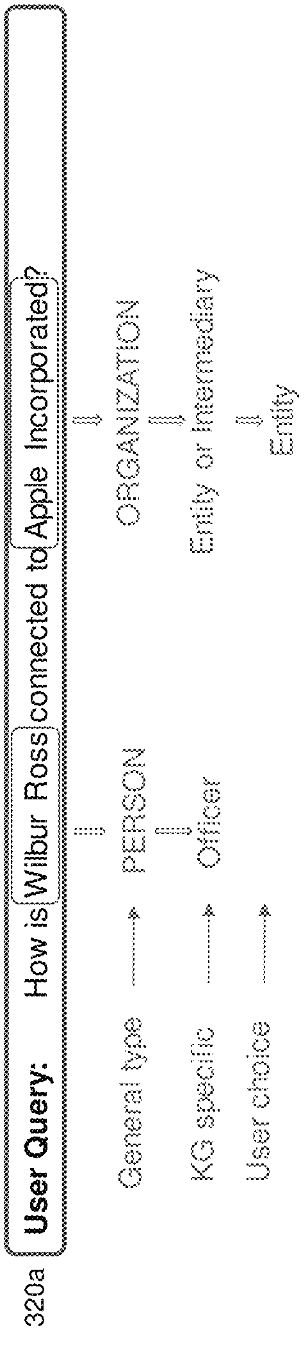

Referring to FIG. 3C, in one or more embodiments, system 320 implements query augmentation (adjustment) via named entity reconciliation (NER). That is, using the NER performed in system 310, system 320 augments (adjusts) the user query 320*a* to use name specific mapping to the knowledge graph database's entities and add labels to the names resulting in an augmented (adjusted) user query 320*b*. Once there are enough examples of labels for user queries, they are stored and utilized in the future instead of asking the user.

Figure 3D:
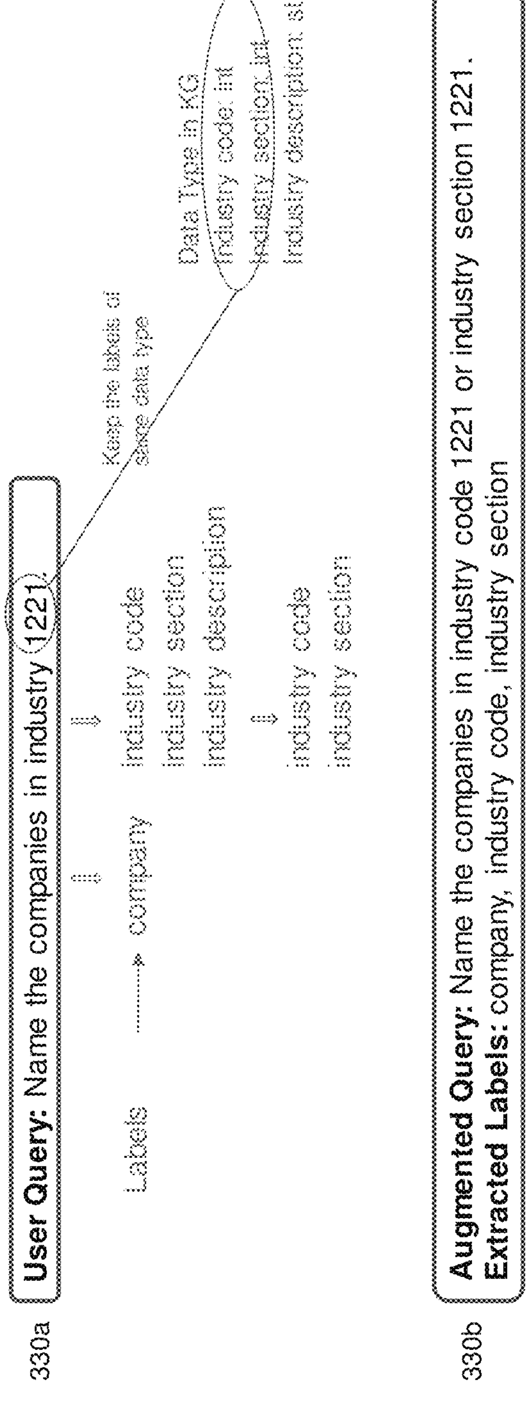

Referring to FIG. 3D, in one or more embodiments, system 330 implements labels identification in augmented (adjusted) query 330*b* from a user query 330*a*. This can include identifying the labels in the augmented (adjusted) query that are nodes and properties of the identified knowledge graph database. If a label corresponds to multiple nodes or properties of the knowledge graph database, the system 330 finds the nodes or properties of the same data pattern (length, type), include them as labels and augment (adjust) the query again using an "or" clause.

Referring to FIG. 3E, in one or more embodiments, system 340 implements LLM prompt engineering that includes ontology extraction based on labels in augmented (adjusted) query 340*a*. This can include extracting a part of ontology 340*b* based on the identified labels for the identified knowledge graph database. The extracted ontology can comprise nodes, properties and relationships involving the identified labels.

Referring to FIG. 3F, in one or more embodiments, system 350 implements LLM prompt engineering that includes example selection based on labels and semantics. The system 350 selects examples based on the labels in and meaning of the augmented query 350*a*. This can include Node-Property examples 350*b* selecting one example for each node-property pair identified, Node-Relationship 350*c* selecting one example for each relationship identified, and Semantically Similar Examples 350*d* selecting a certain number of examples that are the most similar to the augmented (adjusted) query. Examples are important for LLM to perform adequately. The pool of examples comprises three types: (1) Node-Property: examples that reflect the properties of each node, (2) Node-Relationship-Node: examples that reflect one-degree relationships between two nodes, and (3) Inclusive Examples: examples from the perspectives that users are most interested in about the knowledge graph database.

Figure 3G:
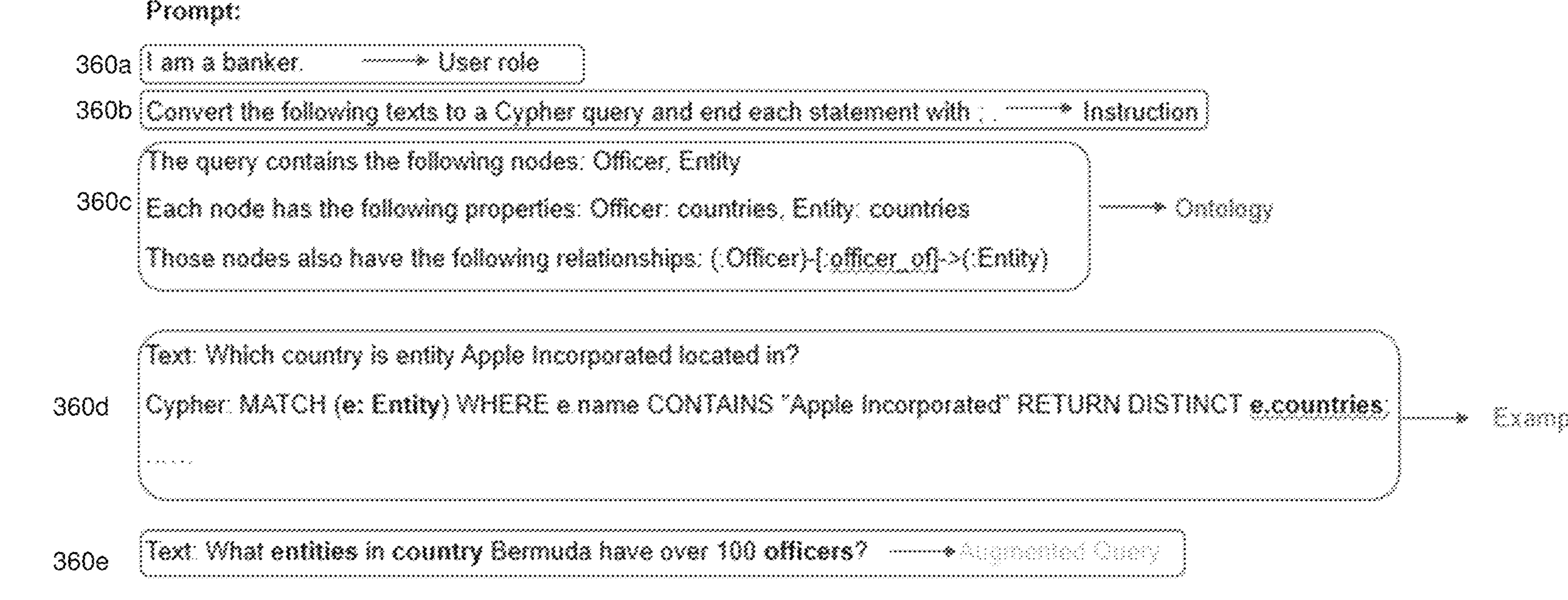

Referring to FIG. 3G, in one or more embodiments, system 360 implements LLM prompt generation. The system 360 integrates the augmented (adjusted) query, the extracted ontology and the selected examples and generates a LLM prompt. Further, system 360 shows a prompt for a user role 360*a*, conversion of text to a Cypher database query 360*b*, extracted ontology 360*c*, examples 360*d*, and augmented (adjusted) query 360*e*.

Figure 3H:
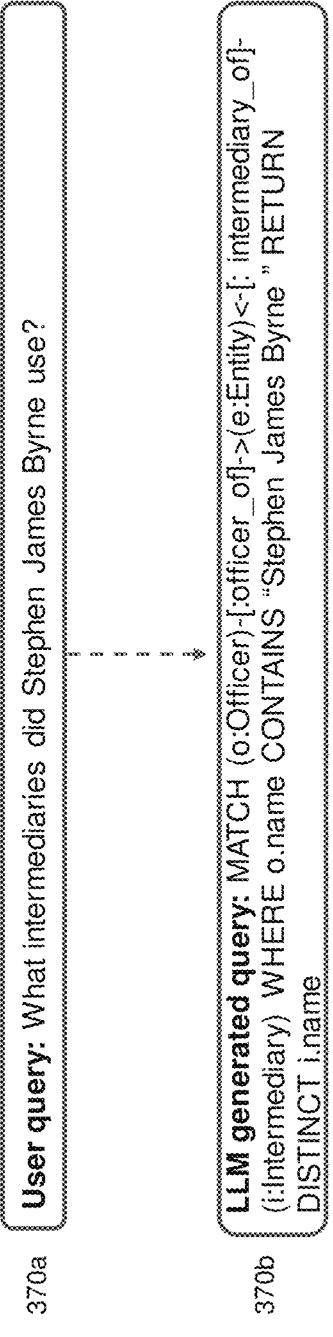

Referring to FIG. 3H, in one or more embodiments, system 370 implements graph (database) query language generation by the LLM based on the user query 370*a* and execution. The system 370 feeds the prompt to the LLM, which then generates a graph (database) query 370*b* for the identified knowledge graph database. The graph (database) query 370*b* is then executed against the identified knowledge graph database.

Figure 3I:
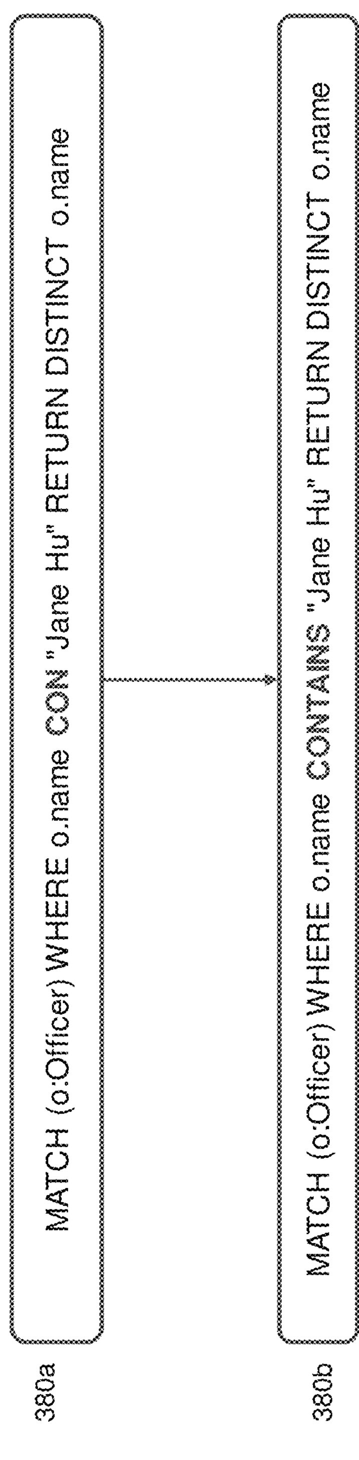

Referring to FIG. 3I, in one or more embodiments, system 380 implements query execution and error handling. After the graph (database) query is executed, if a syntax error 380*a* is determined, then feed graph (database) query and error back into LLM 380*b*, instruct LLM to correct itself, and execute the corrected graph (database) query against the identified knowledge graph database. The number of times for LLM self-correction can be configured for the system 380.

Figure 3J:
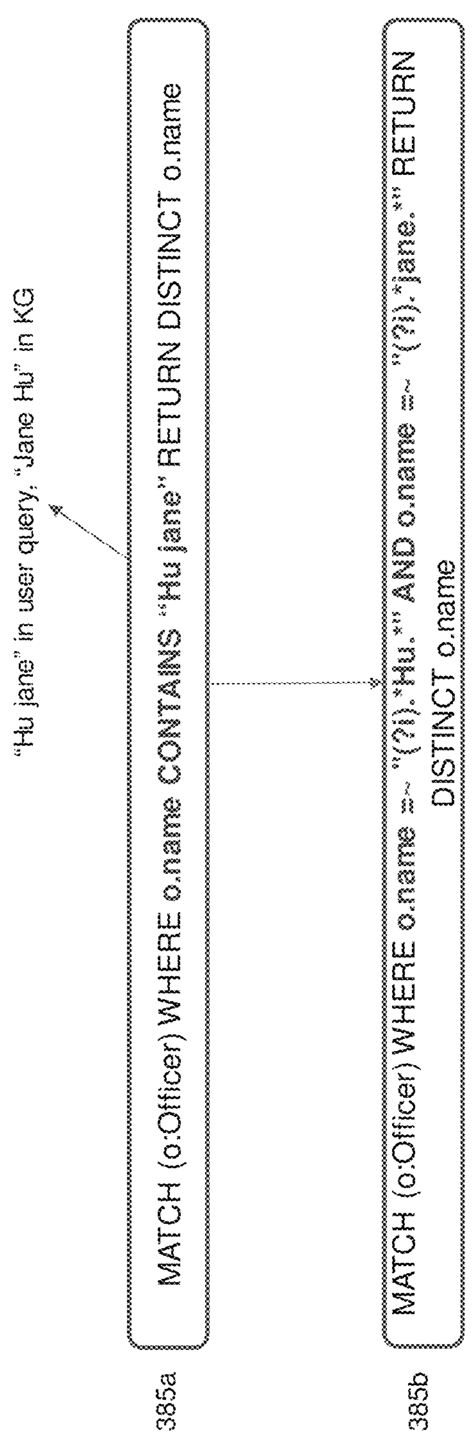

Referring to FIG. 3J, in one or more embodiments, system 385 implements query post-processing. After the graph (database) query 385*a* is executed, if no syntax error is determined but no results are returned from the graph, then the system 385 breaks names in the graph query into tokens, and/or ignore capitalization. Further, the system 385 executes the processed graph (database) query 385*b* to increase hit-rate of the graph (database) query response.

Figure 3K:
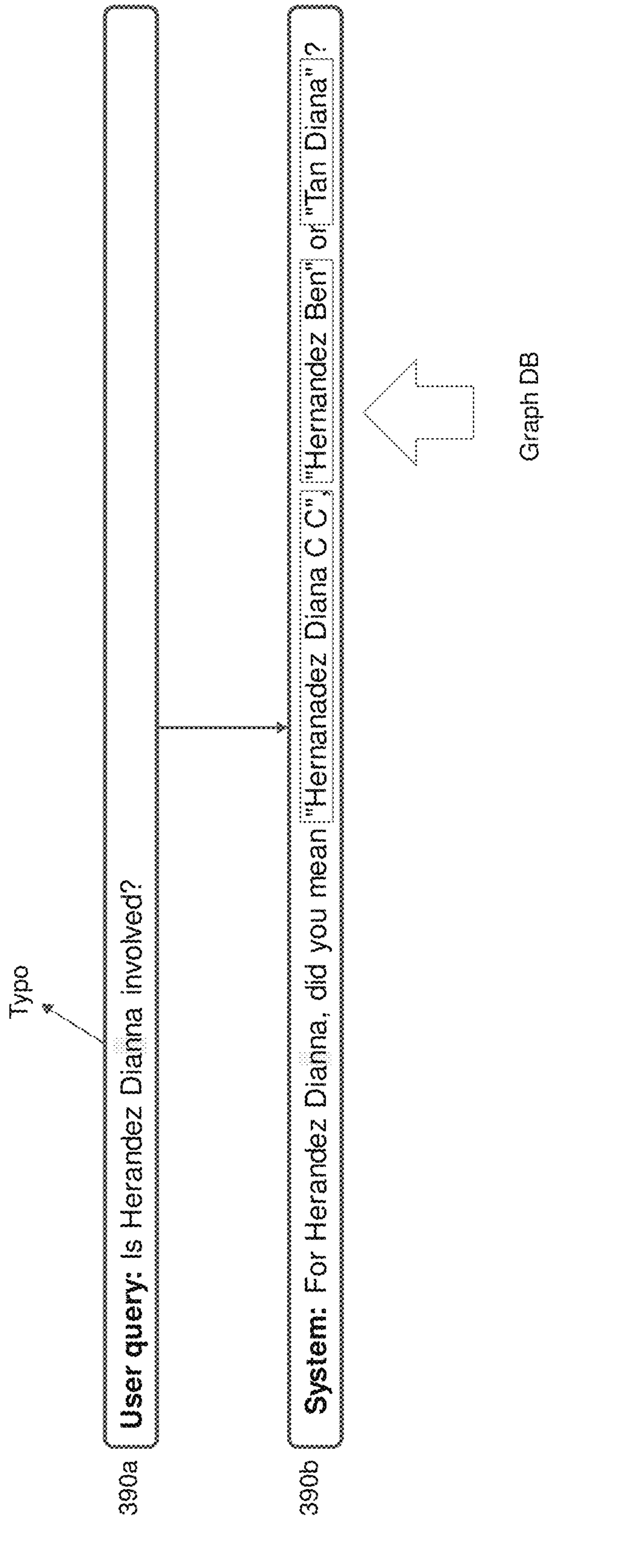

Referring to FIG. 3K, in one or more embodiments, system 390 implements spellcheck. After the processed graph query statement 390*a* is executed, if still no results are returned from the knowledge graph database, then the system 390 finds the most similar names in the knowledge graph database and makes a query suggestion 390*b* for the user.

Figure 3L:
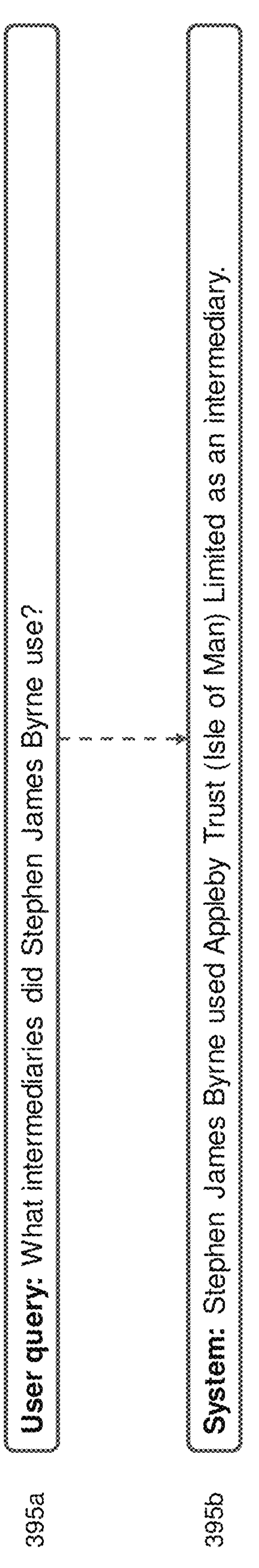

Referring to FIG. 3L, in one or more embodiments, system 395 implements response engineering. That is, if no errors are determined, then results are returned from the graph DB. Further, the system 395 convert results to natural language user query response 395*b* as an answer to the user query 395*a*.

Figure 4:
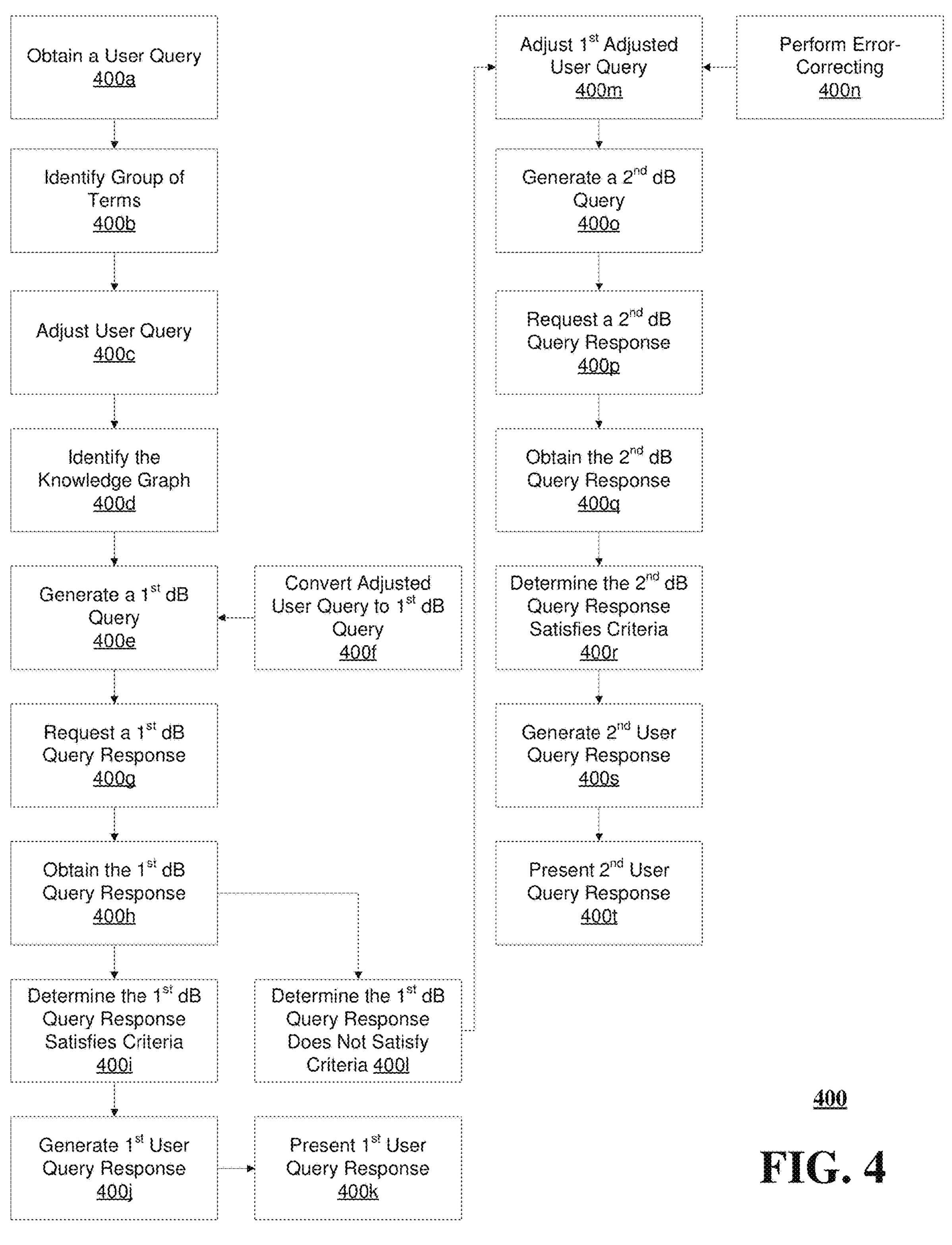
FIG. 4. depicts an illustrative embodiment of a method in accordance with various aspects described herein.

FIG. 4. depicts an illustrative embodiment of a method 400 in accordance with various aspects described herein. In one or more embodiments, aspects of method 400 can be implemented by a server. The method 400 can include the server, at 400*a*, obtaining a user query to access information from a group of knowledge graph databases. The user query corresponds to user-generated input. Further, the method 400 can include the server, at 400*b*, identifying a group of terms within the user query that reduces a likelihood of identifying a match within the group of knowledge graph databases. In addition, the method 400 can include the server, at 400*c*, adjusting the user query resulting in a first adjusted user query that enables identifying a knowledge graph database from the group of knowledge graph databases. Also, the method 400 can include the server, at 400*d*, identifying the knowledge graph database from the group of knowledge graph databases based on the first adjusted user query resulting in an identified knowledge graph database. Further, the method 400 can include the server, at 400*e*, generating a first database query utilizing a large language model based on the first adjusted user query and the knowledge graph database, with the assumption that the first database query having a computer-readable syntax compatible with the identified knowledge graph database. In some embodiments, the method 400 can include the server, at 400*f*, converting the adjusted user query to a database query based on the knowledge graph database. In further embodiments, the generating of the database query comprises converting the adjusted user query to the database query having a computer-readable syntax compatible with the identified knowledge graph database.

In one or more embodiments, the method 400 can include the server, at 400*g*, requesting a first database query response from the identified knowledge graph database according to the first database query. Further, the method 400 can include the server, at 400*h*, obtaining the first database query response from the identified knowledge graph database based on the first database query. In addition, the method 400 can include the server, at 400*i*, determining the first database query response satisfies response criteria resulting in a first determination. Also, the method 400 can include the server, at 400*j*, generating a first user query response based on the first database query response and the first determination. Further, the method 400 can include the server, at 400*k*, presenting the first user query response to a user.

In one or more embodiments, the method 400 can include the server, at 400*l*, determining that the first database query response does not satisfy response criteria resulting in a second determination. Further, the method 400 can include the server, at 400*m*, adjusting the first adjusted user query utilizing the large language model based on the second determination resulting in a second adjusted user query. In some embodiments, the method 400 can include the server, at 400*n*, performing error-correcting on the first adjusted user query utilizing the large language model based on the second determination. In further embodiments, the adjusting of the first adjusted user query comprises performing error-correcting on the first adjusted user query based on the second determination.

In one or more embodiments, the method 400 can include the server, at 400*o*, generating a second database query from based on the second adjusted user query and the identified knowledge graph database. Further, the method 400 can include the server, at 400*p*, requesting a second database query response from the identified knowledge graph database according to the second database query. In addition, the method 400 can include the server, at 400*q*, obtaining the second database query response from the identified knowledge graph database based on the second database query. Also, the method 400 can include the server, at 400*r*, determining the second database query response satisfies response criteria resulting in a third determination. Further, the method 400 can include the server, at 400*s*, generating a second user query response based on the second database query response and the third determination. In addition, the method 400 can include the server, at 400*t*, presenting the second user query response to a user. In some embodiments, the computer-readable syntax can comprise Cypher.

While for purposes of simplicity of explanation, the respective processes are shown and described as a series of blocks in FIG. 4, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. One or more blocks in FIG. 4 can be performed in response to one or more blocks in FIG. 4.

Portions of some embodiments can be combined with portions of other embodiments.

Figure 5:
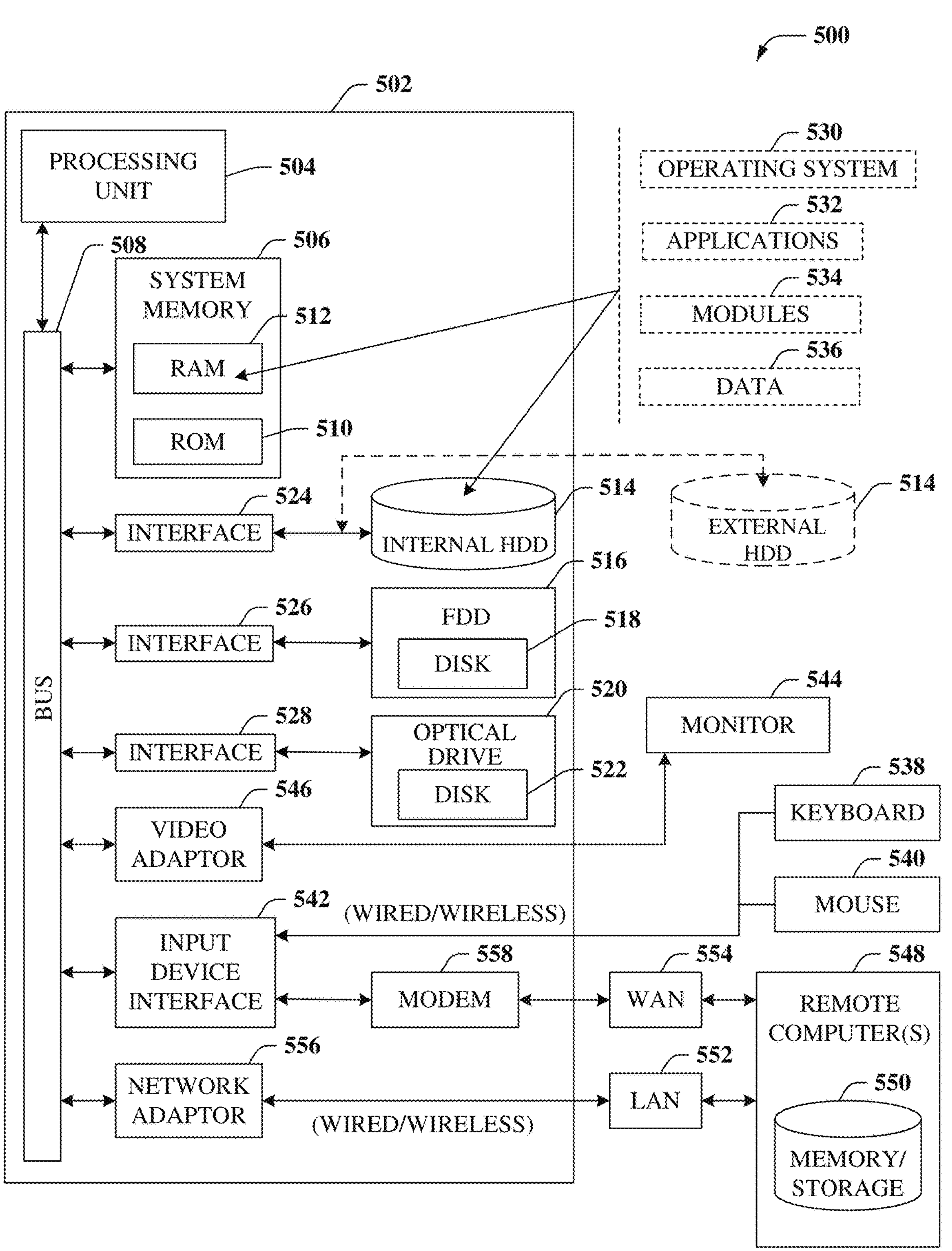
FIG. 5 is a block diagram of an example, non-limiting embodiment of a computing environment in accordance with various aspects described herein.

Turning now to FIG. 5, there is illustrated a block diagram of a computing environment in accordance with various aspects described herein. In order to provide additional context for various embodiments of the embodiments described herein, FIG. 5 and the following discussion are intended to provide a brief, general description of a suitable computing environment 500 in which the various embodiments of the subject disclosure can be implemented. For example, computing environment 500 can facilitate in whole or in part adjusting a user query in requesting information from a knowledge graph database. Further, each of server 100*a*, communication device 100*c*, knowledge graph database 100*b*-1, knowledge graph database 100*b*-2, and knowledge graph database 100*b*-3 comprise computing environment 500.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 5, the example environment can comprise a computer 502, the computer 502 comprising a processing unit 504, a system memory 506 and a system bus 508. The system bus 508 couples system components including, but not limited to, the system memory 506 to the processing unit 504. The processing unit 504 can be any of various commercially available processors. Dual microprocessors and other multiprocessor architectures can also be employed as the processing unit 504.

The system bus 508 can be any of several types of bus structure that can further interconnect to a memory bus (with or without a memory controller), a peripheral bus, and a local bus using any of a variety of commercially available bus architectures. The system memory 506 comprises ROM 510 and RAM 512. A basic input/output system (BIOS) can be stored in a non-volatile memory such as ROM, erasable programmable read only memory (EPROM), EEPROM, which BIOS contains the basic routines that help to transfer information between elements within the computer 502, such as during startup. The RAM 512 can also comprise a high-speed RAM such as static RAM for caching data.

The computer 502 further comprises an internal hard disk drive (HDD) 514 (e.g., EIDE, SATA), which internal HDD 514 can also be configured for external use in a suitable chassis (not shown), a magnetic floppy disk drive (FDD) 516, (e.g., to read from or write to a removable diskette 518) and an optical disk drive 520, (e.g., reading a CD-ROM disk 522 or, to read from or write to other high-capacity optical media such as the DVD). The HDD 514, magnetic FDD 516 and optical disk drive 520 can be connected to the system bus 508 by a hard disk drive interface 524, a magnetic disk drive interface 526 and an optical drive interface 528, respectively. The hard disk drive interface 524 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 502, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 512, comprising an operating system 530, one or more application programs 532, other program modules 534 and program data 536. All or portions of the operating system, applications, modules, and/or data can also be cached in the RAM 512. The systems and methods described herein can be implemented utilizing various commercially available operating systems or combinations of operating systems.

A user can enter commands and information into the computer 502 through one or more wired/wireless input devices, e.g., a keyboard 538 and a pointing device, such as a mouse 540. Other input devices (not shown) can comprise a microphone, an infrared (IR) remote control, a joystick, a game pad, a stylus pen, touch screen or the like. These and other input devices are often connected to the processing unit 504 through an input device interface 542 that can be coupled to the system bus 508, but can be connected by other interfaces, such as a parallel port, an IEEE 1394 serial port, a game port, a universal serial bus (USB) port, an IR interface, etc.

A monitor 544 or other type of display device can be also connected to the system bus 508 via an interface, such as a video adapter 546. It will also be appreciated that in alternative embodiments, a monitor 544 can also be any display device (e.g., another computer having a display, a smart phone, a tablet computer, etc.) for receiving display information associated with computer 502 via any communication means, including via the Internet and cloud-based networks. In addition to the monitor 544, a computer typically comprises other peripheral output devices (not shown), such as speakers, printers, etc.

The computer 502 can operate in a networked environment using logical connections via wired and/or wireless communications to one or more remote computers, such as a remote computer(s) 548. The remote computer(s) 548 can be a workstation, a server computer, a router, a personal computer, portable computer, microprocessor-based entertainment appliance, a peer device or other common network node, and typically comprises many or all of the elements described relative to the computer 502, although, for purposes of brevity, only a remote memory/storage device 550 is illustrated. The logical connections depicted comprise wired/wireless connectivity to a local area network (LAN) 552 and/or larger networks, e.g., a wide area network (WAN) 554. Such LAN and WAN networking environments are commonplace in offices and companies, and facilitate enterprise-wide computer networks, such as intranets, all of which can connect to a global communications network, e.g., the Internet.

When used in a LAN networking environment, the computer 502 can be connected to the LAN 552 through a wired and/or wireless communication network interface or adapter 556. The adapter 556 can facilitate wired or wireless communication to the LAN 552, which can also comprise a wireless AP disposed thereon for communicating with the adapter 556.

When used in a WAN networking environment, the computer 502 can comprise a modem 558 or can be connected to a communications server on the WAN 554 or has other means for establishing communications over the WAN 554, such as by way of the Internet. The modem 558, which can be internal or external and a wired or wireless device, can be connected to the system bus 508 via the input device interface 542. In a networked environment, program modules depicted relative to the computer 502 or portions thereof, can be stored in the remote memory/storage device 550. It will be appreciated that the network connections shown are example and other means of establishing a communications link between the computers can be used.

The computer 502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data. Computer-readable storage media can comprise the widest variety of storage media including tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:

a processing system including a processor; and a memory that stores executable instructions that, when executed by the processing system, facilitate performance of operations, the operations comprising:

obtaining a first user query and a second user query to access information from a group of knowledge graph databases, wherein the first user query corresponds to first user-generated input, wherein the second user query corresponds to second user-generated input;

identifying a first group of terms within the first user query and identifying a second group of terms within the second user query that reduces a likelihood of identifying a match within the group of knowledge graph databases, wherein the first group of terms comprises a first group of ambiguities and the second group of terms comprises a second group of ambiguities;

adjusting the first user query by removing the first group of ambiguities resulting in a first adjusted user query that enables identifying a first knowledge graph database from the group of knowledge graph databases;

adjusting the second user query by removing the second group of ambiguities resulting in a second adjusted user query that enables identifying a second knowledge graph database from the group of knowledge graph databases;

determining that the second adjusted user query matches a cached user query stored in a cache resulting in a first determination;

based on the first determination, accessing a cached user query response associated with the cached user query;

providing the cached user query response to a communication device associated with a user;

determining a group of named entities within the first adjusted user query resulting in a second determination;

based on the second determination, identifying the first knowledge graph database from the group of knowledge graph databases based on the first adjusted user query resulting in an identified knowledge graph database; and generating a first database query utilizing a large language model based on the first adjusted user query and the first knowledge graph database, the first database query having a computer-readable syntax compatible with the identified knowledge graph database.

2. The device of claim 1, wherein the operations comprise:

requesting a first database query response from the identified knowledge graph database according to the first database query; and obtaining the first database query response from the identified knowledge graph database based on the first database query.

3. The device of claim 2, wherein the operations comprise:

determining the first database query response satisfies a response criteria resulting in a third determination; and generating a first user query response based on the first database query response and the third determination.

4. The device of claim 3, wherein the operations comprise providing the first user query response to the communication device associated with the user.

5. The device of claim 2, wherein the operations comprise determining that the first database query response does not satisfy a response criteria resulting in a fourth determination.

6. The device of claim 5, wherein the operations comprise:

adjusting the first adjusted user query utilizing the large language model based on the fourth determination resulting in a third adjusted user query; and generating a second database query from based on the third adjusted user query and the identified knowledge graph database.

7. The device of claim 6, wherein the adjusting of the first adjusted user query comprises performing error-correcting on the first adjusted user query based on the fourth determination.

8. The device of claim 6, wherein the operations comprise:

requesting a second database query response from the identified knowledge graph database according to the second database query; and obtaining the second database query response from the identified knowledge graph database based on the second database query.

9. The device of claim 8, wherein the operations comprise:

determining the second database query response satisfies the response criteria resulting in a third determination; and generating a second user query response based on the second database query response and the third determination.

10. The device of claim 9, wherein the operations comprise providing the second user query response to the communication device associated with the user.

11. The device of claim 1, wherein the computer-readable syntax is associated with a Cypher database query language.

12. A non-transitory machine-readable medium, comprising executable instructions that, when executed by a processing system including a processor, facilitate performance of operations, the operations comprising:

obtaining a first user query and a second user query to access information from a group of knowledge graph databases;

identifying a first group of terms within the first user query and identifying a second group of terms within the second user query that reduces a likelihood of identifying a match within the group of knowledge graph databases, wherein the first group of terms comprises a first group of ambiguities and the second group of terms comprises a second group of ambiguities;

adjusting the first user query by removing the first group of ambiguities resulting in a first adjusted user query that enables identifying a first knowledge graph database from the group of knowledge graph databases;

adjusting the second user query by removing the second group of ambiguities resulting in a second adjusted user query that enables identifying a second knowledge graph database from the group of knowledge graph databases;

determining that the second adjusted user query matches a cached user query stored in a cache resulting in a first determination;

based on the first determination, accessing a cached user query response associated with the cached user query;

providing the cached user query response to a communication device associated with a user;

determining a group of named entities within the first adjusted user query resulting in a second determination;

based on the second determination, identifying the first knowledge graph database from the group of knowledge databases based on the first adjusted user query resulting in an identified knowledge graph database; and converting the first adjusted user query to a database query utilizing a large language model based on the identified knowledge graph database.

13. The non-transitory machine-readable medium of claim 12, wherein the operations comprise:

requesting a database query response from the identified knowledge graph database according to the database query; and obtaining the database query response from the identified knowledge graph database based on the database query.

14. The non-transitory machine-readable medium of claim 13, wherein the operations comprise:

determining the database query response satisfies a response criteria resulting in a determination; and generating a user query response based on the database query response and the determination.

15. The non-transitory machine-readable medium of claim 14, wherein the operations comprise providing the user query response to the communication device associated with the user.

16. The non-transitory machine-readable medium of claim 12, wherein the first user query corresponds to user-generated input.

17. The non-transitory machine-readable medium of claim 12, wherein the database query comprises computer-readable syntax compatible with the identified knowledge graph database.

18. The non-transitory machine-readable medium of claim 17, wherein the computer-readable syntax is associated with a Cypher database query language.

19. A method comprising:

obtaining, by a processing system including a processor, a first user query and a second user query to access information from a group of knowledge graph databases;

identifying, by the processing system, a first group of terms within the first user query and identifying, by the processing system, a second group of terms within the second user query that reduces a likelihood of identifying a match with the group of knowledge graph databases, wherein the first group of terms comprises a first group of ambiguities and the second group of terms comprises a second group of ambiguities;

adjusting, by the processing system, the first user query by removing the first group of ambiguities resulting in first adjusted user query that enables identifying a first knowledge graph database from the group of knowledge graph databases;

adjusting, by the processing system, the second user query by removing the second group of ambiguities resulting in a second adjusted user query that enables identifying a second knowledge graph database from the group of knowledge graph databases;

determining, by the processing system, that the second adjusted user query matches a cached user query stored in a cache resulting in a first determination;

based on the first determination, accessing, by the processing system, a cached user query response associated with the cached user query;

providing, by the processing system, the cached user query response to a communication device associated with a user;

determining, by the processing system, a group of named entities within the first adjusted user query resulting in a second determination;

based on the second determination, identifying, by the processing system, the first knowledge graph database from the group of knowledge databases based on the first adjusted user query resulting in an identified knowledge graph database; and generating, by the processing system, a database query utilizing a large language model based on the first adjusted user query and the identified knowledge graph database.

20. The method of claim 19, wherein the generating of the database query comprises converting the first adjusted user query to the database query having a computer-readable syntax compatible with the identified knowledge graph database.

* * * * *